(No Model.)
W. TUCKER.
CUTTING-OFF TOOL FOR LATHES.
No. 456,279. Patented July 21, 1891.
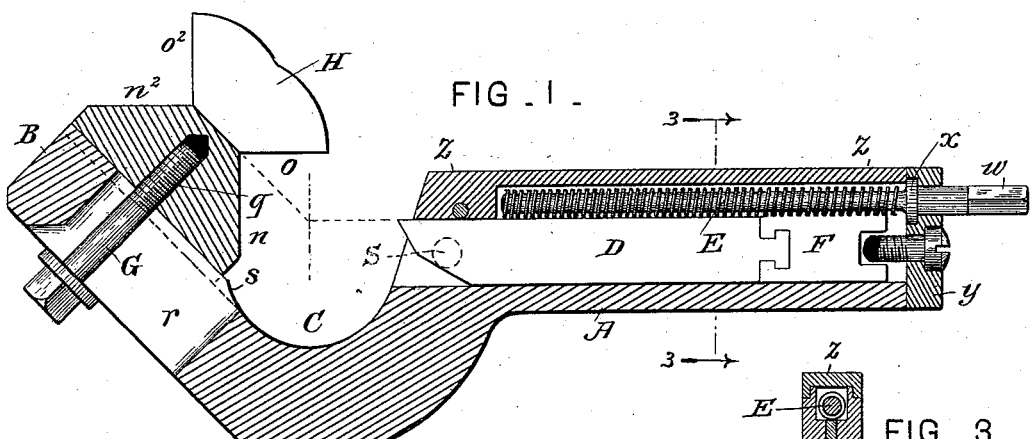
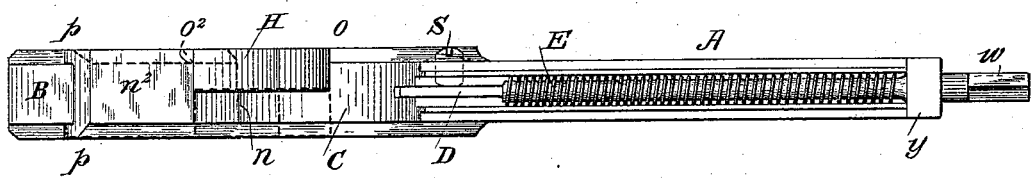
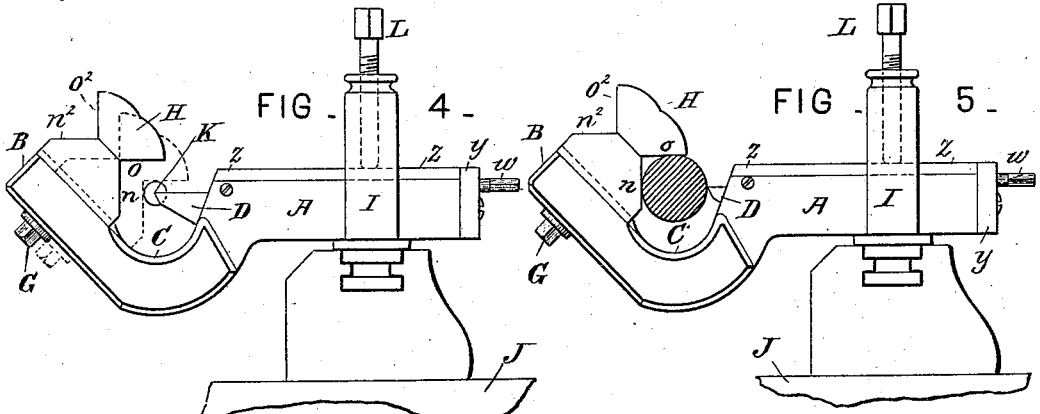
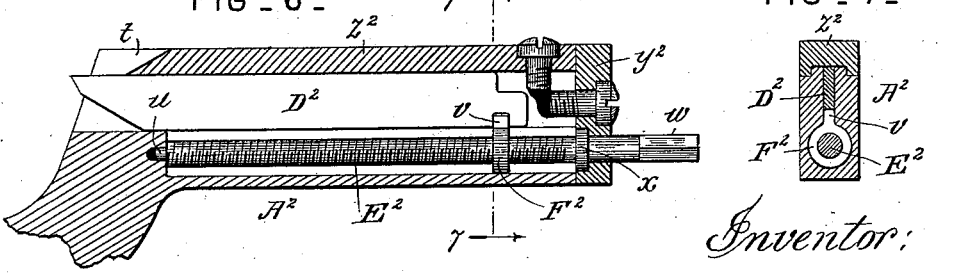
Attest: Geo. T. Smallwood. Geo. W. Whitney.
Inventor: William Tucker By his Attorney

UNITED STATES PATENT OFFICE.

WILLIAM TUCKER, OF EAST BROOKFIELD, MASSACHUSETTS, ASSIGNOR OF ONE-HALF TO WILLARD WARD CLOCK, OF ISLIP, NEW YORK.

CUTTING-OFF TOOL FOR LATHES.

SPECIFICATION forming part of Letters Patent No. 456,279, dated July 21, 1891.

Application filed October 28, 1890. Serial No. 369,631. (No model.)

*To all whom it may concern:*

Be it known that I, WILLIAM TUCKER, a citizen of the United States, and a resident of East Brookfield, in the State of Massachusetts, have invented a new and useful Improvement in Cutting-Off Tools for Lathes, of which the following is a specification.

This invention relates to labor-saving attachments for engine-lathes; and it consists in an improved cutting-off tool and in certain novel combinations of parts embodied therein, as hereinafter set forth and claimed.

The improved tool is adapted to be held in the tool-post, like an ordinary one-part tool, and is adapted to afford a firm support for the piece to be cut in two, and thus to permit the piece to be cut very rapidly without danger of springing it so as to close the cut upon the cutting-blade, or of the work rolling up on the edge of the blade and breaking itself or the tool, or both, and so that the work is completely severed by the tool and the ends are rendered smooth and finished without bestowing further labor upon them.

The objects of the respective parts of the present invention are, first, to provide for centering the tool by means of the back center of the lathe and to adapt it to be used for any diameter of work within its range when so centered; secondly, to locate the bearings of the work-supporting back-rest close to and so as to be directly opposed to the pressure of the cutting-blade; thirdly, to adapt the said back-rest to bear on the work on either side of the blade, right or left, as required, and, fourthly, to provide for withdrawing and replacing the blade when it requires grinding or renewal without displacing any other part of the tool.

A sheet of drawings accompanies this specification as part thereof.

Figure 1 of the drawings represents a vertical longitudinal section of the improved tool. Fig. 2 is a top view thereof with the top cap of the blade guide or sheath removed. Fig. 3 is a cross-section on the line 3 3, Fig. 1. Figs. 4 and 5 are small-scale elevations of the tool as applied to a lathe, illustrating, respectively, the operations of centering the tool and of cutting off a piece of metal. Fig. 6 represents a vertical longitudinal section of a modified tool; and Fig. 7 is a cross-section on the line 7 7, Fig. 6.

Like letters of reference indicate corresponding parts in the several figures.

The stock of the tool comprises a horizontal "sheath" portion A or $A^2$, an inclined guide portion B, rising at an angle of forty-five degrees from a lower horizontal plane, and a connecting portion C, which is preferably rigid and in one part with the guide B and with the body of the sheath portion. The other parts of the sheath are a longitudinal top cap $z$ or $z^2$ and an end cap $y$ or $y^2$, each attached to its said body by a single screw.

Within the sheath a cutting-blade D or $D^2$, rectangular in cross-section and of uniform dimensions, slides longitudinally, its protruding rear end having been suitably ground, and is advanced and retracted by means of a feed-screw E or $E^2$. This screw is supported against endwise movement by means of a fast collar $x$, let into the inner side of the end cap of the sheath, through which the squared driving end $w$ of the feed-screw projects. It may be conveniently turned by a small wrench, similar to a clock-key, applied to its square.

In the tool as represented by Figs. 1 to 5 the feed-screw E is above the blade D, and the latter is coupled endwise to a screw-rack F, which meshes with the screw, and from which the blade is readily detached sidewise when fully protruded.

In the modified tool, Figs. 6 and 7, the blade $D^2$ is above the feed-screw $E^2$ and connected therewith by a sleeve-nut having a wing $v$, of the same width as the blade, which interlocks with a notch in the lower edge of the blade and keeps the nut from turning. Its body may consequently be and is cylindrical, so as to work in a drilled recess in the body of the sheath $A^2$. The feed-screw may in this arrangement have a step-bearing $u$, Fig. 6, at its inner end, and the top cap $z^2$ may be held at its corresponding end by lugs $t$, so that both cap-screws may be located at the outer end of the sheath, as shown. Other like modifications will suggest themselves to those skilled in the art.

A steady-screw S, Figs. 1 and 2, provides for tightening the blade, if necessary, to prevent chattering.

The inclined guide B has a central longitudinal rib $s$ on its upper side, and a longitudinal slot $r$, perpendicular thereto, extends through said rib and receives a bolt G by means of which a back-rest H is fastened in any required position upon the guide. The back-rest has a central screw-socket $q$, Fig. 1, to receive the bolt G, and lateral flanges $p$, Fig. 2, to coact with the edges of the rib $r$. By loosening the bolt so as to disengage said flanges from the rib the back-rest may be turned on the axis of the bolt, and thus reversed, end for end, as indicated in dotted lines in Fig. 2. It has at its respective ends top and back bearings $o\ n\ o^2\ n^2$, with the top bearings $o\ o^2$ confined to one side of its center, so that they are respectively right and left. The right-hand bearings are shown in effective position in Figs. 1, 4, and 5 and in full lines in Fig. 2, and the left-hand position is indicated in Fig. 2 by dotted lines, as aforesaid. The top bearings are horizontal in such effective position and the back bearings are vertical.

The tool is adapted to be held in an ordinary tool-post I upon the tool-carriage J of a lathe, and is elevated and depressed by the ordinary means for elevating and depressing lathe-tools.

In centering the tool by means of the back center K in the tail-stock of the lathe, as illustrated by Fig. 4, the top of the blade D or $D^2$ is first brought level with the point of the center K by raising or lowering the tool-post I. The back-rest H is then slid down upon the center K until it touches. If the top bearing $o$ or $o^2$ touches first, the whole of the cutting-off tool may be drawn forward through the tool-post I until the rest H impinges the center K equally top and back. The blade is now fastened by tightening the tool-post screw L. Then, since the back-rest moves at an angle of forty-five degrees up or down, it will touch any size of circle within its range, top and back, by sliding it on the guide B. Reversing the back-rest will not affect its centering as above.

Preparatory to the cutting-off operation (illustrated by Fig. 5) it is only necessary to lower the back-rest H into contact with the work with its right or left bearings in position, as required, and to fasten it by the bolt G. In the cutting-off operation no part of the tool moves or changes its position, except the blade D or $D^2$, which is forced out of its sheath A or $A^2$ by the feed-screw E or $E^2$. The work cannot shut upon the blade when nearly cut off, being supported by the back bearing of the back-rest from bending backward under the pressure of the blade, and the work cannot roll up on the blade by springing upward, for the top bearing of the back-rest prevents any yielding of the work in this direction. Hence by means of this tool a piece can be cut entirely off and without any danger of breaking the blade or bending and spoiling the work.

The blade is ground only on its cutting end, and when grinding or renewal is necessary the blade is protruded from the sheath by the feed-screw until it can be disengaged from the feeding devices and removed from the tool.

Having thus described the said cutting-off tool, I claim as my invention and desire to patent under this specification—

1. The combination, in a cutting-off tool for lathes, of a sliding blade having a horizontal upper edge, means for feeding the blade into the work, a back-rest guide at an angle of forty-five degrees, and a back-rest adjustable upon said guide and having a vertical bearing for the back of the work and a horizontal bearing for the top of the work, substantially as hereinbefore specified.

2. In a cutting-off tool for lathes, the combination, with a stock comprising a sheath portion, inclined back-rest guide, and rigid connecting portion, of a horizontally-sliding blade within the sheath, means for protruding the blade into the work, and a back-rest adjustable upon said guide and having a vertical bearing for the back of the work diametrically opposed to the blade and extending on both sides of the cut in the work and a horizontal bearing for the top of the work on one side of the cut, substantially as hereinbefore specified.

3. In combination with a slotted back-rest guide inclined at an angle of forty-five degrees, a reversible back-rest having right and left top and side bearings at its respective ends, and means for clamping said back-rest upon said guide in its respective positions, substantially as hereinbefore specified.

4. In combination with a sheath adapted to be clamped in an ordinary tool-post, a longitudinal feed-screw permanently located within the sheath, secured against longitudinal movement and having a protruding driving end, a screw-rack or its described equivalent sliding within the sheath, and a cutting-off blade sliding within said sheath and detachable laterally from said screw-rack or its equivalent when fully protruded, substantially as hereinbefore specified.

WILLIAM TUCKER.

Witnesses:
T. R. RHETTEPLACE,
M. TUCKER.